(12) United States Patent
Finlayson et al.

(10) Patent No.: US 8,611,534 B2
(45) Date of Patent: Dec. 17, 2013

(54) ELECTRO-OPTIC WAVEGUIDE POLARISATION MODULATOR

(75) Inventors: Ewan D Finlayson, Malvern (GB); Philip M Gorman, Malvern (GB); John M Heaton, Malvern (GB); Michael J Kane, Malvern (GB); Brian S Lowans, Malvern (GB)

(73) Assignee: QinetiQ Limited, London (GB)

( * ) Notice: Subject to any disclaimer, the term of this patent is extended or adjusted under 35 U.S.C. 154(b) by 1273 days.

(21) Appl. No.: 12/310,922

(22) PCT Filed: Sep. 12, 2007

(86) PCT No.: PCT/GB2007/003431
§ 371 (c)(1),
(2), (4) Date: Apr. 23, 2009

(87) PCT Pub. No.: WO2008/032048
PCT Pub. Date: Mar. 20, 2008

(65) Prior Publication Data
US 2010/0111303 A1  May 6, 2010

(30) Foreign Application Priority Data
Sep. 12, 2006 (GB) .................................. 0617899.0

(51) Int. Cl.
*G02F 1/35* (2006.01)
*H04J 14/06* (2006.01)
*H04L 9/00* (2006.01)

(52) U.S. Cl.
USPC .................................. 380/256; 385/2; 398/65

(58) Field of Classification Search
USPC .................................. 380/256; 385/2; 398/65
See application file for complete search history.

(56) References Cited

U.S. PATENT DOCUMENTS

| 3,704,996 A | 12/1972 | Borner et al. |
| 4,291,939 A | 9/1981 | Giallorenzi |
| 4,691,984 A | 9/1987 | Thaniyavarn |

(Continued)

FOREIGN PATENT DOCUMENTS

| EP | 1 503 328 | 2/2005 |
| EP | 1 605 287 | 12/2005 |

(Continued)

OTHER PUBLICATIONS

Office Action mailed Aug. 1, 2012 in co-pending U.S. Appl. No. 12/993,098.
C.H. Bennett et al, "Quantum Cryptography: Public Key Distribution and Coin Tossing" International Conference on Computers, Systems & Signal Processing, Dec. 1984.
V. Fernandez et al, "Gigahertz Clocked Quantum Key Distribution in Passive Optical Networks" IEEE 2006, pp. 36-37.
V. Fernandez et al, "Passive Optical Network Approach to Gigahertz-Clocked Multiuser Quantum Key Distribution" *IEEE Journal of Quantum Electronics*, vol. 43, No. 2, Feb. 2007, pp. 130-138.

(Continued)

*Primary Examiner* — Kambiz Zand
*Assistant Examiner* — Aubrey Wyszynski
(74) *Attorney, Agent, or Firm* — Nixon & Vanderhye P.C.

(57) ABSTRACT

An electro-optic waveguide polarization modulator (20) comprising a waveguide core (4) having first and second faces defining a waveguide core plane, a plurality of primary electrodes (22, 24) arranged at a first side of the waveguide core plane and out of said plane, and at least one secondary electrode (26) arranged at a second side of the waveguide core plane and out of said plane, wherein the electrodes (22, 24, 26) are adapted in use to provide an electric field having field components (13, 15) in two substantially perpendicular directions within the waveguide core (4) so as modulate the refractive index thereof such that electromagnetic radiation propagating through the core (4) is converted from a first polarization state to a second polarization state.

19 Claims, 4 Drawing Sheets

(56) References Cited

U.S. PATENT DOCUMENTS

| | | | |
|---|---|---|---|
| 4,775,971 A | | 10/1988 | Bergmann |
| 4,807,952 A | | 2/1989 | Jaeger |
| 5,150,436 A | | 9/1992 | Jaeger |
| 5,166,991 A | | 11/1992 | Jaeger |
| 5,428,698 A | * | 6/1995 | Jenkins et al. ............... 385/27 |
| 5,566,257 A | | 10/1996 | Jaeger |
| 5,757,912 A | | 5/1998 | Blow |
| 5,768,378 A | | 6/1998 | Townsend et al. |
| 6,028,935 A | | 2/2000 | Rarity et al. |
| 6,278,548 B1 | * | 8/2001 | Shimano et al. ............ 359/565 |
| 7,130,493 B2 | * | 10/2006 | Heaton et al. .................. 385/3 |
| 7,155,078 B2 | | 12/2006 | Welch et al. |
| 7,162,107 B2 | | 1/2007 | Jaeger et al. |
| 7,242,775 B2 | | 7/2007 | Vig et al. |
| 7,242,821 B2 | | 7/2007 | Jaeger et al. |
| 7,248,695 B1 | | 7/2007 | Beal et al. |
| 7,274,791 B2 | | 9/2007 | van Enk |
| 7,289,688 B2 | | 10/2007 | Jaeger et al. |
| 7,327,432 B2 | * | 2/2008 | Skjonnemand ............ 349/168 |
| 8,081,270 B2 | * | 12/2011 | Lazarev ...................... 349/62 |
| 2002/0060760 A1 | * | 5/2002 | Weiner ........................ 349/96 |
| 2003/0169958 A1 | | 9/2003 | Ridgway et al. |
| 2003/0223668 A1 | | 12/2003 | Breukelaar et al. |
| 2004/0086229 A1 | * | 5/2004 | Ahn et al. .................... 385/40 |
| 2004/0184603 A1 | * | 9/2004 | Pearson et al. ............... 380/28 |
| 2004/0252957 A1 | * | 12/2004 | Schmidt et al. ............. 385/131 |
| 2006/0002563 A1 | * | 1/2006 | Bussieres et al. ........... 380/278 |
| 2006/0067603 A1 | | 3/2006 | Bull et al. |
| 2006/0104592 A1 | * | 5/2006 | Jenkins et al. ............. 385/140 |
| 2006/0290941 A1 | | 12/2006 | Kesler et al. |
| 2007/0065154 A1 | * | 3/2007 | Luo et al. .................... 398/141 |
| 2007/0065155 A1 | * | 3/2007 | Luo et al. .................... 398/141 |
| 2007/0122097 A1 | * | 5/2007 | Schmidt et al. ............. 385/131 |
| 2008/0317423 A1 | | 12/2008 | Stepanov et al. |

FOREIGN PATENT DOCUMENTS

| | | |
|---|---|---|
| EP | 1 633 076 | 3/2006 |
| GB | 2 379 847 | 3/2003 |
| GB | 2 379 452 | 7/2004 |
| JP | 63-313120 | 12/1988 |
| JP | 04-233518 | 8/1992 |
| JP | 08076148 * | 3/1996 |
| JP | 2000-295175 | 10/2000 |
| JP | 2004-520614 | 7/2004 |
| JP | 2005-268958 | 9/2005 |
| JP | 2006-013573 | 1/2006 |
| JP | 2007-500370 | 1/2007 |
| TW | 200521509 | 7/2005 |
| WO | WO 92/11550 | 7/1992 |
| WO | WO 92/11551 | 7/1992 |
| WO | WO 92/11554 | 7/1992 |
| WO | WO 92/11555 | 7/1992 |
| WO | WO 95/07582 | 3/1995 |
| WO | WO 97/44936 | 11/1997 |
| WO | WO 02/057844 | 7/2002 |
| WO | WO 03/065091 | 8/2003 |
| WO | WO 2004/083915 | 9/2004 |
| WO | WO 2004/083923 | 9/2004 |
| WO | WO 2005/012968 | 2/2005 |
| WO | WO 2005/012970 | 2/2005 |
| WO | WO 2006/134290 | 12/2006 |
| WO | WO 2007/105834 | 9/2007 |

OTHER PUBLICATIONS

T. Horikiri et al, "Quantum key distribution with a heralded single photon source" pp. 1617-1618.
P. Kumavor et al, "Comparison of four multi-user quantum key distribution schemes over passive optical networks" 2003.
M.L. Masanovic, "Design and Performance of a Monolithically Integrated Widely Tunable All-Optical Wavelength Converter With Independent Phase Control" *IEEE Photonics Technology Letters*, vol. 16, No. 10, Oct. 2004, pp. 2299-2301.
Y. Nambu et al, "BB84 Quantum Key Distribution System based on Silica-Based Planar Lightwave Circuits" *Jpn. J Appl. Phys.* vol. 43, No. 8B, 2004.
D. Yin et al, "Integrated Arrow waveguides with hollow cores" *Optics Express*, vol. 12, No. 12, Jun. 2004, pp. 2710-2715.
S. Haxha et al, "Analysis of polarization conversion in AlGaAs/GaAs electrooptic polarization converter" *Optics Communications*, vol. 262, No. 1, Jun. 2006, pp. 47-56.
E.D. Finlayson et al, "Polarization Conversion in Passive Deep-Etched GaAs/AlGaAs Waveguides" *Journal of Lightwave Technology*, vol. 24, No. 3, Mar. 2006, pp. 1425-1432.
Japanese Official Action and English translation dated Apr. 9, 2012 in JP 2009-527883.
International Search Report for PCT/GB2007/003431, mailed Jun. 25, 2007.
Written Opinion of the International Searching Authority for PCT/GB2007/003431, mailed Jun. 25, 2007.
International Preliminary Report on Patentability for PCT/GB2007/003431, received Jul. 10, 2008.
Heaton et al., "Optimization of Deep-Etched, Single-Mode GaAS/A1 G9 As Optical Waveguides Using Controlled Leakage Into the Substrate", Journal of Lightwave Technology, vol. 17, No. 2, Feb. 1999.
M Schlak et al., "Tunable TE/TM-Mode Converter on (001)- InP-Substrate", IEEE Photonics Technology Letters, vol. 3 No. 1, Jan. 1991.
Amnon Yariv, "Coupled-Mode Theory for Guided-Wave Optics", IEEE Journal of Quantum Electronics, vol. QE-9, No. 9, Sep. 1973.
Shyqyri Haxha et al., "Design of the Semiconductor Polarisation Controller Based on the Electrooptic Effect", Integrated Optics, Proc. of Spie vol. 6183, (2006).
S.Y Wang et al., "High Speed III-V Electrooptic Waveguide Modulators at α=1.3 μm", Journal of Lightwave Technology, vol. 6, No. 6, Jun. 1988.
David Hall et al., "Optical Guiding and Electro-Optic Modulation in Ga As Epitaxial Layers", Optics Communications vol. 1, No. 9, Apr. 1970.
IEEE Photonics Technology Letters [Online], vol. 13, No. 8, Aug. 2001, "AlGaAs-GaAs Polarization Converter with Electrooptic Phase Mismatch Control", pp. 830-832, http://ieeexplore.ieee.org/ie15/68/20254/00935818.pdf.
Great Britain Search Report for 0617899.0, filed Jan. 4, 2007.
Gordeev et al., "Tunable Electro-Optic Polarization Modulator for Quantum Key Distribution Applications", Optics Communications, North-Holland Publishing Co., Amsterdam, NL, vol. 234, No. 1-6, Apr. 15, 2004, pp. 203-210, XP004499684.
Nicolas Grossard et al., "AlGaAs-GaAs Polarization Converter with Electrooptic Phase Mismatch Control", IEEE Photonics Technology Letters, IEEE Service Center, Piscataway NJ, US, vol. 13, No. 8, Aug. 2001, XP011047704.
Izuhara T. et al., "Low-Voltage Tunable TE/ TM Converter on ion-sliced Lithium Niobate Thin Film", Electronics Letters, IEE Stevenage, GB, vol. 39, No. 15, Jul. 2003, pp. 1118-1119, XP006020699.
Farnoosh Rahmatian et al., "An Ultrahigh-Speed AlGaAs-GaAs Polarization Converter Using Slow-Wave Coplanar Electrodes", May 1998, IEEE Photonics Technology Letters, IEEE Service Center, Piscataway, NJ, US, XP011046059.
Office Action mailed Sep. 12, 2012 in co-pending U.S. Appl. No. 12/863,509.
F. Benabid, "Hollow-core photonic bandgap fibre: new light guidance for new science and technology" *Phil. Trans.* 364, 2006, pp. 3439-3462.
English translation of Japanese Final Rejection issued Mar. 4, 2013 in JP 2003-527883.
US 5,150,251, 9/1992 (withdrawn).

* cited by examiner

ELECTRO-OPTIC WAVEGUIDE POLARISATION MODULATOR

This application is the U.S. national phase of International Application No. PCT/GB2007/003431, filed 12 Sep. 2007 which designated the US and claims priority to Great Britain Application No. 0617899.0, filed 12 Sep. 2006, the entire contents of each of which are hereby incorporated by reference.

The present invention relates to an electro-optic waveguide polarisation modulator and to a method of operating the same. The invention relates specifically, but not exclusively, to an electro-optic waveguide polarisation modulator for use in an integrated optical system.

Electro-optic waveguide polarisation modulators are of interest for a variety of optical communications applications including Dense Wavelength Division Multiplexing (DWDM), polarisation modulation transmission schemes for telecommunications applications, and secure quantum key distribution (QKD) for quantum cryptography (QC) applications.

By way of background to the present invention, electro-optic waveguide polarisation modulators are known which utilise the linear electro-optic effect (the Pockels effect) to control the polarisation state of light within an optical waveguide. The simplest of these devices consists of a single electro-optic waveguide with an electrode on the top surface and a conducting region underneath allowing the application of a vertical electric field to the electro-optic waveguide (for example see D. Hall, A. Yariv, and E. Garmire, "Optical Guiding and Electro-Optic Modulation in GaAs Epitaxial Layers," *Opt. Commun.*, vol. 1, pp. 403-405, 1970; N. Y. Gordeev, K. J. Gordon, and G. S. Buller, "Tunable Electro-Optic Polarization Modulator for Quantum Key Distribution Applications," *Optics Communications* 234 (2004), pp. 203-210.

Although the abovementioned modulators are capable of controlling the polarisation state of light within the optical waveguide, devices of this kind require an input polarisation state that contains equal horizontal and vertical components. The linear electro-optic effect is used within these devices to modulate the phase of the horizontal component only, resulting in output polarisation states that are limited to +45°, −45°, right hand circular, left hand circular, and intermediate elliptical states. These states form a subset of the polarisation states represented on the Poincaré sphere. The Poincaré sphere is a mathematical representation that maps all possible polarisation states, including the variations of linear, circular and elliptical polarisation states, onto a spherical surface. Linear horizontal or vertical output states may not be obtained using these devices.

An alternative form of electro-optic waveguide polarisation modulator, normally used with a horizontal polarisation input state, is also known. For example, see F. Rahmatian, N. A. F. Jaeger, R. James, and E. Berolo, "An Ultrahigh-Speed Polarization Converter Using Slow-Wave Coplanar Electrodes," *IEEE Photon. Technol. Lett.*, vol. 10, pp. 675-677, 1998; M. Schlak, C. M. Weinert, P. Albrecht, and H. P. Nolting, "Tunable TE/TM-Mode Converter on (001)-InP-Substrate," *IEEE Photon. Technol. Lett.*, vol. 3, pp. 15-16, 1991; and N. Grossard, H. Porte, J. P. Vilcot, Bruno Bèche and J. P. Goedgebuer, "AlGaAs—GaAs Polarization Converter with Phase Mismatch Control," *IEEE Photon. Technol. Lett.*, vol. 13, pp. 830-832, 2001.

This type of device is based on a shallow-etched waveguide with an electrode placed on either side of the waveguide ridge in order to provide a horizontal electric field within the waveguide core. The horizontal electric field enables coupling between horizontal and vertical polarisation components by altering the refractive index ellipsoid (the optical indicatrix) of the semiconductor crystal in such a way that the principal dielectric axes exist at angles of +45° and −45° to those directions. However, in general the polarised modes of the waveguide device are not orientated at the +45° and −45° angles of the crystal birefringence because of the waveguide birefringence introduced by the waveguide boundaries. For complete conversion from the horizontal input polarisation to a vertical output polarisation to occur, it is necessary to eliminate or allow for the waveguide birefringence (also called the phase mismatch).

The devices referenced above suffer from shortcomings such as limited polarisation conversion efficiency or the requirement for specialised fabrication processes which prevent integration with other waveguide devices. For example, the device proposed by Rahmatian et al. uses low-birefringence waveguides without independent electro-optic control of the phase mismatch. The device reported by Schlak et al. allows for the presence of the phase mismatch by using a periodic reversal of the horizontal electric field direction with a longitudinal period matched to the phase-reversal length. This requires complex drive circuitry and a specialised fabrication process. The polarisation converter proposed by Grossard et al. does provide independent electro-optic control of the phase mismatch by the application of a vertical electric field component. However, there are drawbacks resulting from the specific configuration of the electrodes, whereby an electrode to the side of the optical region is used as the ground for an electrode on top of the waveguide and for an electrode on the opposite side of the waveguide, without a separate ground plane underneath the waveguide. This results in poor overlap of the vertical and horizontal electric field components with the optical field, with consequent large switching voltages. Because of the horizontal offset of the ground electrode, a voltage signal applied between the top electrode and ground results in both vertical and horizontal electric field components being produced. This prevents the integration of devices which require only a vertical electric field, such as phase modulators and Mach-Zehnder interferometers. Additionally, to allow placement of the lateral electrodes in the same plane as the optical field the waveguide must be formed by shallow etching, which limits the scope for control of the waveguide birefringence in the waveguide design, and precludes the possibility of integration of waveguide components which require deep etching, such as small-radius bends.

These limitations arise from the absence of a ground plane underneath the waveguide and the fact that the electrodes on the top surface of the device are not co-planar. Co-planar electrodes are not used in the device proposed by Grossard et al. since it was not hitherto thought possible to create a horizontal electric field of requisite field strength within the waveguide core using co-planar electrodes arranged over the top of the waveguide.

Another alternative form of electro-optic polarisation modulator is described in S. Thaniyavarn, "Wavelength-Independent Polarization Converter," U.S. Pat. No. 4,691,984, 1987. This type of device consists of a lithium niobate optical waveguide, featuring a co-planar electrode configuration without a separate ground plane. The configuration features three co-planar electrodes positioned above the plane of the optical waveguide, the central electrode being placed directly above the waveguide and the two further electrodes being displaced laterally from the waveguide to each side. One of the side electrodes provides the ground for both of the other electrodes. This configuration permits the application and independent control of substantially horizontal and vertical applied electric field components.

The use of this configuration, in which at least one of the co-planar electrodes is not positioned directly above the waveguide, is limited to waveguides that are formed in a substrate that has a flat upper surface that extends beyond the lateral extent of the waveguide. This is typically the case in lithium niobate waveguides in which the lateral extent of the waveguiding region is defined by titanium diffused into the material, not by etching of the surface. This co-planar configuration cannot be realised with etched waveguides. Consequently, the structure cannot be integrated with waveguide components which require deep etching, such as small-radius bends. The configuration also suffers from the shortcomings associated with the use of a lateral ground electrode, namely a poor overlap of the horizontal and vertical field components with the optical field, and a difficulty applying a vertical field component without also inducing a horizontal field component.

Notwithstanding the foregoing, new research undertaken by the applicant has revealed that co-planar electrodes arranged directly above an electro-optic waveguide having an underlying common electrode can provide the requisite vertical and horizontal electric fields within the waveguide core to alter the refractive index ellipsoid therein without the need for additional electrodes disposed at the sides of the waveguide. Indeed, this research has unexpectedly shown that such configuration of co-planar upper electrodes is capable of providing a useable overlap between the vertical and horizontal electric fields and the optical field within the waveguide core. This configuration permits the application and independent control of substantially horizontal and vertical applied electric field components.

Hence, contrary to accepted wisdom, co-planar electrodes positioned directly above a waveguide have been shown to provide a suitable means for creating both vertical and horizontal electric fields within the core of an electro-optic waveguide polarisation modulator and hence, in this respect, the present invention overcomes a technical prejudice in the prior art.

The only known prior art to demonstrate the application of the abovementioned prior art device to quantum cryptography, was described in N. Y. Gordeev, K. J. Gordon, G. S. Buller, "Tunable Electro-Optic Polarization Modulator for Quantum Key Distribution Applications," *Optics Communications* 234 (2004), p 203-210. This prior art describes how to operate the prior art polarisation modulator at 850 nm wavelength for fibre-optic applications, and only for two pairs of relative polarisation states −45° and 45°, and left-circular and right-circular. In addition it only describes how to use the device for transmitting a signal in quantum cryptography applications. This prior art describes how to use the device for particular quantum cryptography protocols B92 and BB84 that require either two or four discrete polarisation states respectively. The B92 protocol is described in C. H. Bennett, "Quantum Cryptography Using Any Two Nonorthogonal States", *Phys Rev Lett* (1992), p 3121-3124, and the BB84 protocol in C. H. Bennett, G. Brassard, 'Quantum cryptography: Public key distribution and coin tossing', Proc IEEE International Conference on Computers, Systems and Signal Processing, Bangalore, India, p 175-179 (1984).

Accordingly, it is an object of the invention to provide an electro-optic waveguide polarisation modulator which mitigates at least some of the disadvantages of the conventional devices described above.

In addition it is also an object of the invention to describe how an improved modulator design can enable the generation of any polarisation state on the Poincaré sphere. This will enable compensation for polarisation distortion through an optical transmission path over a communications network.

In addition it is also an object of the invention to describe how an improved modulator design can enable the application to the quantum protocols B92, BB84 and also other protocols such as Six-state and new emerging protocols that require more than six different polarisation states.

In addition it is also an object of the invention to describe how to use an electro-optic waveguide polarisation modulator in the receiver of a quantum cryptography system.

According to a first aspect of the present invention, there is now proposed an electro-optic waveguide polarisation modulator comprising a waveguide core having first and second faces defining a waveguide core plane, a plurality of primary electrodes arranged at a first side of the waveguide core plane and out of said plane, and at least one secondary electrode arranged at a second side of the waveguide core plane and out of said plane, wherein the electrodes are adapted in use to provide an electric field having field components in two substantially perpendicular directions within the waveguide core so as modulate the refractive index thereof such that electromagnetic radiation propagating through the core is converted from a first polarisation state to a second polarisation state.

For the purposes of this specification, a horizontal direction shall be defined as being parallel to the surface of the substrate and the interfaces between the epitaxial layers grown thereon, and perpendicular to the direction of propagation within the waveguide core. A positive sign is defined as the left to right direction when viewed along the direction of propagation within the waveguide core, with the substrate below the epitaxial layers. For the purpose of defining polarisation azimuth, angles are measured anticlockwise from the horizontal direction. An angle of 90° gives the vertical direction.

Preferably, the first polarisation state comprises any polarisation state. Specifically, the first polarisation state may comprise a linear polarisation state having an azimuth angle in the range $-\pi/2$ to $\pi/2$, both right-hand circular and left-hand circular polarisation states and an elliptical polarisation state with any combination of azimuth angle in the range $-\pi/2$ to $\pi/2$ and ellipticity in the range $-1$ to $1$.

Advantageously, the second polarisation state comprises any polarisation state.

In a preferred embodiment, the plurality of primary electrodes are arranged in a substantially planar first electrode layer, and the at least one secondary electrode is arranged in a substantially planar second electrode layer, the first and second electrode layers being substantially parallel.

Preferably, the first electrode layer is substantially parallel with a first face of the waveguide core and the second electrode layer is substantially parallel with an opposing face of the waveguide core.

Conveniently, the waveguide core is disposed between the primary electrodes and the at least one secondary electrode.

Preferably, the primary electrodes are arranged on the first cladding layer in an area defined substantially by the horizontal extent of the electromagnetic field of electromagnetic waves travelling within the waveguide core. By way of example, the primary electrodes may be arranged on a top surface of the first cladding layer directly above the region of the waveguide core within which the electromagnetic waves are guided.

In another embodiment, the electro-optic waveguide polarisation modulator comprises a plurality of the secondary electrodes within the second electrode layer.

Where the first and second electrode layers are substantially parallel, the electrodes are preferably adapted in use to provide an electric field having a first component arranged in a direction substantially perpendicular to the first and second electrode layers and a second component arranged in an direction substantially parallel with the first and second electrode layers.

In another preferred embodiment, the primary electrodes comprise coplanar stripline electrodes adapted in use to provide an electric field which propagates in a longitudinal direction within the waveguide core at substantially the same speed as that of optical electromagnetic radiation propagating therein and being matched thereto.

According to a second aspect of the present invention, there is now proposed an integrated optical waveguide system comprising a polarisation modulator according to the first aspect of the invention.

According to a third aspect of the present invention, there is now proposed an optical communication network comprising a polarisation modulator according to the first aspect of the invention, wherein the modulator is adapted in use to compensate for polarisation distortion arising within said network.

The polarisation modulator is preferably adapted in use within said optical communication network to apply a polarisation compensation at least one of a transmitter in the network, a receiver in the network, and at any position along which an optical signal is transmitted through the network.

According to a fourth aspect of the present invention, there is now proposed a quantum cryptography system comprising a polarisation modulator according to the first aspect of the invention.

The polarisation modulator is preferably adapted in use within said quantum cryptography system to modulate an optical signal transmitted there-from. Alternatively, or in addition, the polarisation modulator is adapted in use within the quantum cryptography system to modulate an optical signal received there-by.

According to a fifth aspect of the present invention, there is now proposed a method of modulating the polarisation of electromagnetic radiation using a polarisation modulator according to the first aspect of the invention comprising the steps of:
(i) inputting electromagnetic radiation having a first polarisation state into the polarisation modulator,
(ii) applying a first voltage $V_1$ between a first primary electrode and at least one secondary electrode and applying a second voltage $V_2$ between a second primary electrode and at least one secondary electrode, so as to provide an electric field component in a first direction within the waveguide core substantially perpendicular to the waveguide core plane so as to modulate the refractive index of the waveguide core in a direction substantially perpendicular to the first direction.

Preferably, the method comprises the further step of:
(iii) outputting electromagnetic radiation having a second polarisation state from the polarisation modulator.

Advantageously, the method comprises the additional step of:
(iv) applying a first voltage $V_1$ between a first primary electrode and at least one secondary electrode and applying a second voltage $V_2$ between a second primary electrode and at least one secondary electrode so as to provide an electric field component in a second direction within the waveguide core substantially parallel with the waveguide core plane so as to modulate the refractive index of the waveguide core in directions inclined at angles ±45° to the first direction.

In a preferred embodiment, the magnitude of the modulation of the refractive index in the direction substantially perpendicular to the first direction within the waveguide core is proportional to the mean value of the first voltage $V_1$ and the second voltage $V_2$.

In another embodiment, the magnitude of the modulation of the refractive index in directions inclined at angles ±45° to the first direction within the waveguide core is proportional to the modulus of the difference between the first voltage $V_1$ and the second voltage $V_2$.

The present method is beneficial in that it permits the application and independent control of substantially horizontal and vertical electric field components applied to the polarisation modulator.

According to a sixth aspect of the present invention, there is now proposed a method of modulating the polarisation state of electromagnetic radiation propagating in an electro-optic waveguide core having first and second faces defining a waveguide core plane, comprising the step of providing within the waveguide core from a first position outside the waveguide core plane adjacent the first face and a second position outside the waveguide core plane adjacent the second face an electric field having field components in a first direction and in a second direction substantially perpendicular to the first direction so as to convert the polarisation state of the electromagnetic radiation from a first polarisation state to a second polarisation state.

Preferably, the first direction is substantially perpendicular to the waveguide core plane. Even more preferably, the second direction is substantially parallel with the waveguide core plane.

According to another aspect of the present invention, there is now proposed a method of fabricating an electro-optic waveguide polarisation modulator according to the first aspect of the invention comprising the steps of:
(i) forming an electro-optic structure comprising a plurality of layers of semiconductor material arranged in a series of substantially parallel planes on a substrate, and
(ii) applying a plurality of primary electrodes within a substantially planar first electrode layer to a surface of the electrode structure distal to the substrate.

In a preferred embodiment, the electro-optic structure comprises III-V semiconductor materials. For example, the electro-optic structure may comprise at least one of indium gallium arsenide (InGaAs) alloys, indium gallium aluminium arsenide phosphide (InAlGaAsP) alloys, indium phosphide (InP), indium antimonide (InSb) and gallium nitride (GaN).

Alternatively, the electro-optic structure comprises II-VI semiconductor materials. In this case, the electro-optic structure may comprise at least one of lithium niobate, strained silicon and an electro-optic polymer material.

The invention will now be described, by example only, with reference to the accompanying drawings in which;

FIG. 5 is an oscilloscope trace showing the output optical signal from the polarisation modulator of FIG. 3 in response to time varying modulation voltages applied to the electrodes of the device.

Referring now to the drawings wherein like reference numerals identify corresponding or similar elements throughout the several views.

Figure 1:
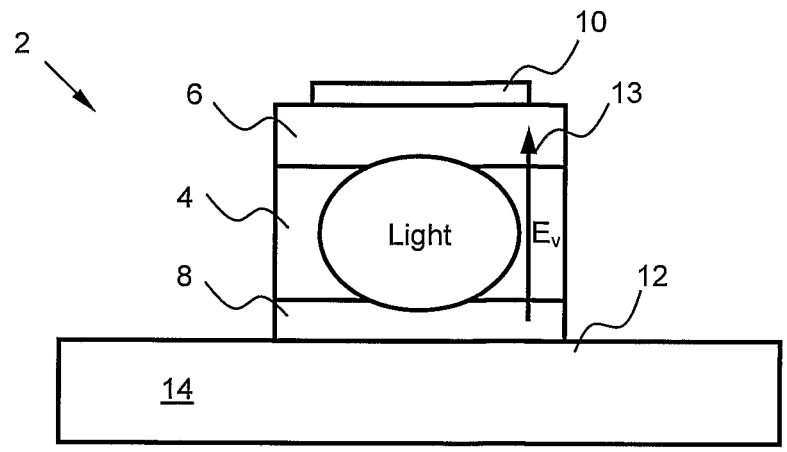
FIG. 1 shows a schematic cross-sectional view of a conventional electro-optic waveguide polarisation modulator described in the prior art.

The waveguide polarisation modulator 2 comprises a deep-etched waveguide having a waveguide core 4 arranged between a first cladding layer 6 and a second cladding layer 8, the device being supported on a substrate 14. The first and second cladding layers 6, 8 are arranged to have a lower refractive index than the waveguide core 4 so as to provide optical confinement within the waveguide core 4. The waveguide modulator 2 is typically fabricated from III-V semiconductor materials using metallorganic vapour phase epitaxy (MOVPE) or molecular beam epitaxy (MBE) processes. Etch regions and metal-deposition regions are typically defined using ultraviolet photolithography. Specifically, the first cladding layer 6 and the second cladding layer 8 typically comprise gallium aluminium arsenide (AlGaAs) alloy whereas the waveguide core 4 and the substrate typically comprise gallium arsenide (GaAs). The waveguide polarisation modulator 2 has a first electrode 10 arranged on the first cladding layer 6 and a second electrode 12 arranged on the second cladding layer 8. In the embodiment shown in FIG. 1 the region of the substrate in the vicinity of the second cladding layer is arranged to be substantially conductive (for example, this region of the substrate may be arranged to be n-type by introducing dopants therein) and therefore operates as the second electrode 12.

The waveguide polarisation modulator 2 utilises the linear electro-optic effect (the Pockels effect) to control the polarisation state of light within the waveguide core 4. Specifically, application of a voltage between the first electrode 10 and second electrode 12 creates a vertical electric field 13 within the waveguide core 4 altering the refractive index thereof and inducing birefringence within the waveguide core 4. In this manner, the waveguide behaves as a variable optical retarder, changing the polarisation of electromagnetic waves travelling within the core 4. Specifically, the applied electric field 13 is used to modulate the magnitude of the refractive index of the waveguide core 4 for the horizontal polarisation component as depicted in FIG. 1. However, the orientation of the index ellipsoid within the core cannot be altered by the applied electric field 13 alone.

In general, the output polarisation states of this type of modulator are restricted to states containing horizontal and vertical components in the same ratio as the input polarisation state. In order that two orthogonal linear output polarisation states may be obtained, this type of modulator is normally operated using an input polarisation state containing equal horizontal and vertical components, for example +45° linear. Accordingly, output polarisation states are limited to +45° linear, −45° linear, right hand circular, left hand circular, and intermediate elliptical states since the modulator 2 only alters the phase of the horizontal component of electromagnetic waves travelling within the waveguide core 4. Hence, linear horizontal or vertical output states may not be obtained using this device.

Figure 2:
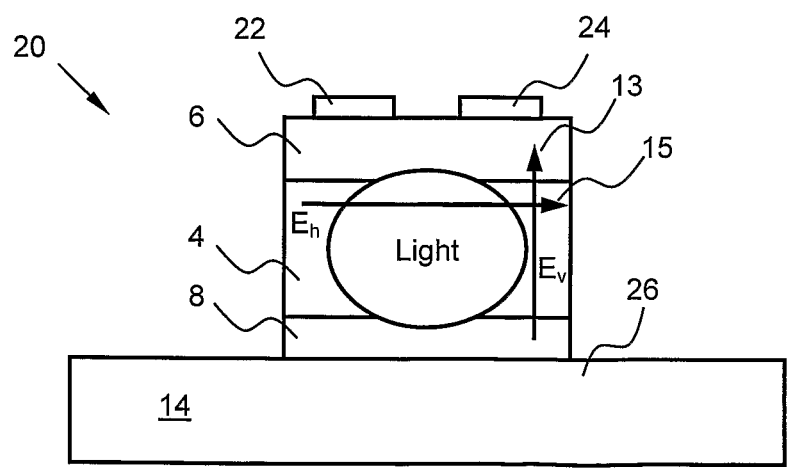
FIG. 2 shows a schematic cross-sectional illustration of an electro-optic waveguide polarisation modulator according to one embodiment of the present invention.

FIG. 2 shows a schematic cross-sectional illustration of an electro-optic waveguide polarisation modulator according to one embodiment of the present invention. The waveguide polarisation modulator 20 according to the present invention comprises a deep-etched waveguide having a waveguide core 4 arranged between a first cladding layer 6 and a second cladding layer 8, the device being supported on a substrate 14. Without limitation, the modulator 20 is fabricated from III-V semiconductor materials using conventional metallorganic vapour phase epitaxy (MOVPE) and molecular beam epitaxy (MBE) processes. Specifically, the first cladding layer 6 and the second cladding layer 8 comprise gallium aluminium arsenide (AlGaAs) alloy whereas the waveguide core 4 and the substrate typically comprise gallium arsenide (GaAs).

Whereas the conventional waveguide polarisation modulator 2 merely comprises first and second electrodes 10, 12 for establishing a vertical electric field 13 within the waveguide core 4, the waveguide polarisation modulator of the present embodiment has first and second electrodes 22, 24 arranged on the first cladding layer 6 and a third electrode 26 arranged on the second cladding layer 8. The first and second electrodes 22, 24 are arranged on the first cladding layer 6 in an area defined substantially by the horizontal extent of the electromagnetic field of electromagnetic waves travelling within the underlying electro-optic waveguide core 4. For example, in this embodiment the first and second electrodes 22, 24 are arranged on the top surface of the deep-etched waveguide and directly above the region of the electro-optic waveguide core 4 within which the electromagnetic waves travel. The region of the substrate 14 in the vicinity of the second cladding layer 8 is arranged to be substantially conductive (for example, this region of the substrate may be arranged to be n-type by introducing dopants therein) and therefore operates as the third electrode 26. Alternatively, the second cladding layer 8 may be substantially conductive so as to act as the third electrode.

In this embodiment, inclusion of first and second electrodes 22, 24 on the first cladding layer 6 enables an electric field having field components 13, 15 in two mutually orthogonal directions (e.g. substantially vertical and horizontal directions) to be created within the waveguide core 4.

Application of a first modulation voltage $V_1$ to the first electrode 22 and a second modulation voltage $V_2$ to the second electrode 24, with respect to the third common electrode 26, enables independent control of the vertical and horizontal electric field components 13, 15 within the waveguide core 4.

The creation of such an electric field within the waveguide core 4 using substantially coplanar electrodes arranged in spaced relation to the waveguide core 4 has not hitherto been thought feasible. Rather, waveguide polarisation modulators described in the prior art have traditionally made use of drive electrodes arranged in a plane which includes the waveguide core 4 to ensure that the electric field extends fully into the waveguide core 4, and to maintain sufficient field strength therein to modulate the phase of electromagnetic radiation propagating through the core 4 (see N. Grossard, H. Porte, J. P. Vilcot, Bruno Bèche and J. P. Goedgebuer, "AlGaAs—

GaAs Polarization Converter with Phase Mismatch Control," *IEEE Photon. Technol. Lett.*, vol. 13, pp. 830-832, 2001).

By way of further explanation of the operation of the present modulator 20, the vertical component ($E_v$) 13 of the applied electric field enables the refractive index of the waveguide core 4 to be modulated in the horizontal direction, while leaving the refractive index for vertically polarised light unchanged. The horizontal component ($E_h$) 15 of the electric field enables the refractive index of the crystal in the waveguide core 4 to be modulated such that a simultaneous change for the directions +45° and −45° occurs with opposite sign, while there is no change for the horizontal and vertical directions. Consequently, the radius of the refractive index ellipsoid of the waveguide core 4 in the x, y, and z directions, and the alignment of the optical electric fields of the polarised modes within the waveguide are both variable in response to the applied modulation voltages $V_1$ and $V_2$.

Note, the presence of metallic electrodes 22, 24 deposited on top of the waveguide forms a Schottky barrier diode at each electrode, which must be reverse-biased if the applied voltage is to be dropped across the optical region. It is therefore only possible to apply electric fields in the single vertical direction v, and horizontal directions h, and minus h.

Accordingly, the configuration of the electrodes in the polarisation modulator 20 of FIG. 2 enables independent control of the angles of the polarised modes of the waveguides and the difference between the effective indices of those modes. Accurate polarisation control from a horizontal polarisation input state is therefore possible. Indeed, the modulator is capable of converting any input polarisation state to any output polarisation state. This means that the modulator is capable of changing the polarisation state from any start point to any end point on the Poincaré sphere.

By way of an example, a simple function that the waveguide polarisation modulator 20 can perform is to convert a horizontal linearly polarised input state to a vertical linear output state. To do this, an offset voltage $V_{offset}$ is applied between the first and second electrodes 22, 24 and the third electrode 26 to create a substantially vertical electric field which alters the effective index of the horizontal polarisation mode to match it to that of the vertical polarisation mode. This value of the offset voltage $V_{offset}$ is also referred to herein as the phase-matching voltage. The phase matching voltage eliminates any waveguide birefringence inherent in the polarisation modulator 20. The modes of the waveguide may now be considered to be polarised at angles of +45° and −45°.

The polarisation modulator 20 is designed such that any inherent waveguide birefringence may be eliminated by applying a phase-matching voltage below the Schottky barrier diode reverse bias breakdown voltage, which is typically in the range 60 V to 80 V. Mindful that the electric fields can only be applied in a single vertical direction due to the Schottky barrier diode at each electrode 22, 24, the waveguide birefringence inherent in the polarisation modulator must be arranged to have the correct sign. The orientation of the polarisation modulator on the substrate 14 wafer also affects whether the horizontal refractive index reduces, remains unchanged, or increases with applied electric field. Factors affecting the waveguide birefringence include the depth of the waveguide core 4, the refractive index step between the cladding 6, 8 and the waveguide core 4, waveguide width and etch depth. The invention permits the variation of all of these parameters, which may therefore be optimised so that the required phase-matching voltage has a specified value. In practice this may be required to meet the constraints imposed by electronic drive circuits.

A differential signal voltage $V_{signal}$ is also applied between the first and second electrodes 22, 24, while maintaining the mean of the voltages applied to first and second electrodes 22, 24 at the phase-matching voltage. This creates an electric field component 15 in a substantially horizontal direction which induces a difference between the effective refractive indices of the ±45° modes, resulting in a relative phase shift. Given a horizontal input polarisation, these modes contain equal amounts of power so accurate conversion to a vertical output state occurs. The differential signal voltage $V_{signal}$ is chosen to produce such a conversion in the available length of waveguide. Alternatively, the differential signal voltage $V_{signal}$ is adjusted to give a circular or elliptical output polarisation. Possible output polarisations include states containing both horizontal and vertical components in any ratio.

The above function of the waveguide polarisation modulator 20 of the present invention may also be considered in terms of coupled-mode theory, where horizontal and vertical modes are assumed, but coupling between them is permitted in the presence of a coupling mechanism. The maximum conversion efficiency is dependent on the difference between the horizontal and vertical effective refractive indices, which is controlled by the vertical electric field component 13 provided by the offset voltage $V_{offset}$. The rate of coupling is controlled by the strength of the coupling mechanism which is controlled by the horizontal electric field component 15 provided by the differential signal voltage, $V_{signal}$. Similar control is available with a linear vertical input state.

The present polarisation modulator 20 has the advantage that it may be fabricated using a standard process without any additional processing stages. Accordingly, it may be integrated with other waveguide structures including devices which require a horizontal polarisation state, such as a Mach-Zehnder interferometer intensity modulator. Because of the enhanced degree of control offered by the present electrode arrangement, the fabrication tolerances are no more demanding than those for other waveguide devices which have been fabricated successfully and repeatably. For the same reason, one device design may be used with a range of wavelengths.

Figure 3:
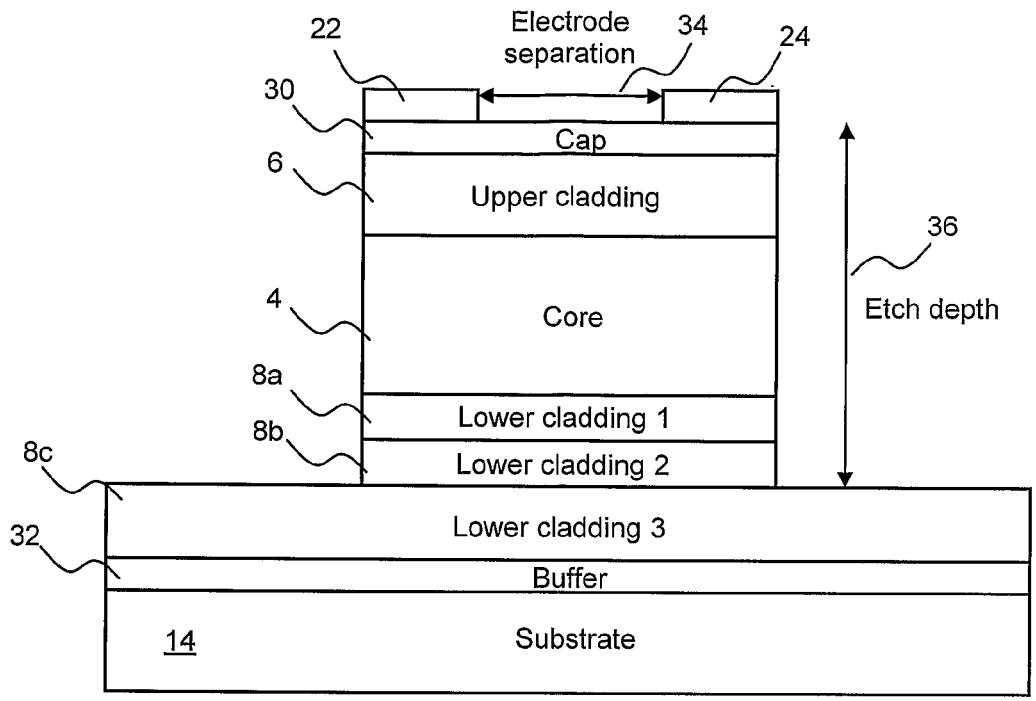
FIG. 3 shows a cross-sectional view of an electro-optic waveguide polarisation modulator according to another embodiment of the present invention.

Another embodiment of the present electro-optic waveguide polarisation modulator is shown in cross-section in FIG. 3. The structure of the device is similar to that of FIG. 2, however an additional cap layer 30 is provided between the electrodes 22, 24 and the first cladding layer 6. The embodiment of FIG. 3 also incorporates a plurality of second cladding layers 8a, 8b, 8c and a buffer layer 32 to decouple the device from the substrate 14. In this embodiment, the silicon doped layers 8a, 8b, 8c of the lower cladding provide third electrode 26. The design of the multiple lower cladding layer structure is optimised to allow only the fundamental spatial modes to propagate with low loss, while higher order modes leak into the substrate. Accurate control of the output state requires that only the fundamental modes are present at the output.

The dimensions of the polarisation modulator are as follows; waveguide width 5.00 µm, electrode width 1.0 µm, electrode separation (denoted in the figures by numeral 34) 3.0 µm, etch depth (denoted in the figures by numeral 36) 4.4 µm, waveguide length 3.0 cm, wavelength of operation 1550 nm.

The composition of the semiconductor material comprising each of the various layers within the polarisation modulator is shown in Table 1.0 below.

TABLE 1.0

| Layer name | Thickness (μm) | AlGaAs composition (% Al) | Doping |
|---|---|---|---|
| Cap 30 | 0.1 | 0 | n- (minimised) |
| Upper cladding 6 | 1.2 | 20 | n- (minimised) |
| Core 4 | 2.4 | 0 | n- (minimised) |
| Lower cladding 8a | 0.3 | 20 | n- (minimised) |
| Lower cladding 8b | 0.4 | 30 | $\sim 1.0 \times 10^{18}/cm^3$ silicon doped |
| Lower cladding 8c | 3.6 | 5.5 | $\sim 5.0 \times 10^{17}/cm^3$ silicon doped |
| Buffer 32 | 0.2 | 0 | $\sim 5.0 \times 10^{17}/cm^3$ silicon doped |
| Substrate 14 | 650 | 0 | None |

The polarisation modulator 20 was designed to operate at a wavelength of 1.55 μm, although it is potentially applicable to a wide range of other wavelengths, for example including 0.6 μm-17 μm in GaAs.

The waveguide birefringence inherent in the present polarisation modulator was arranged so that the refractive index for the horizontal polarisation component was larger than that of the vertical polarisation component. Hence, the propagation direction was selected to coincide with the [011] crystallographic direction on the substrate 14, while the vertical direction corresponded with the [100] crystallographic direction. This configuration enables the refractive index for the horizontal polarisation component to be reduced upon application of the phase-matching voltage. A phase-matching voltage of 39 V was found to be sufficient to eliminate the waveguide birefringence inherent in experimental polarisation modulators according to the present invention. However, this can be reduced by configuring the epitaxy to have a smaller horizontal/vertical index difference at the chosen waveguide width.

A differential signal voltage $V_{signal}$ of 8 V was required to switch the output polarisation state between linear horizontal and vertical in the experimental polarisation modulator according to the present invention. The operation of the device with $V_{signal}$ greater than ±25 V was demonstrated without electrical breakdown occurring.

Figure 4:
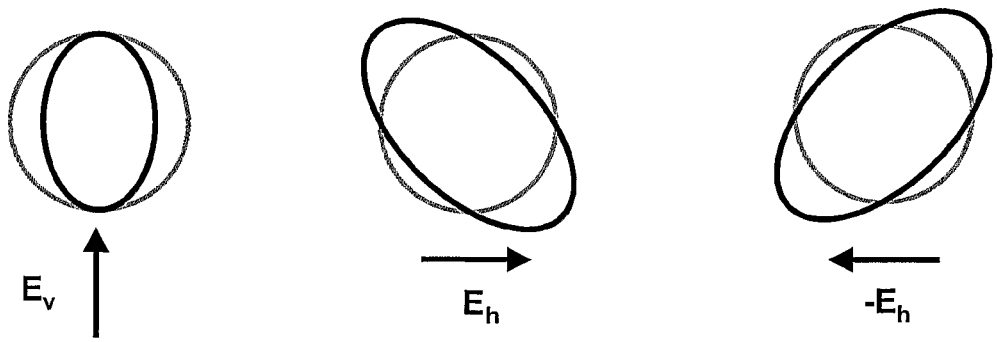
FIG. 4 shows sections through the refractive index ellipsoid for the electro-optic waveguide polarisation modulator of FIG. 3.

The effect of applied fields on the refractive index of the material is illustrated diagrammatically in FIG. 4 which shows sections through the refractive index ellipsoid for the electro-optic waveguide polarisation modulator of FIG. 3. FIG. 4 illustrates the refractive index ellipses for the waveguide core 4 resulting from applying electric fields in the vertical direction v, and horizontal directions h and minus h. The ellipses are shown for propagation along the crystallographic direction [011], while the vertical direction corresponds with the [100] crystallographic direction. The zero birefringence ellipse is denoted by a circle. Note, the ellipticity is greatly exaggerated in the figure to assist visualisation of the refractive index ellipsoid.

Figure 5:
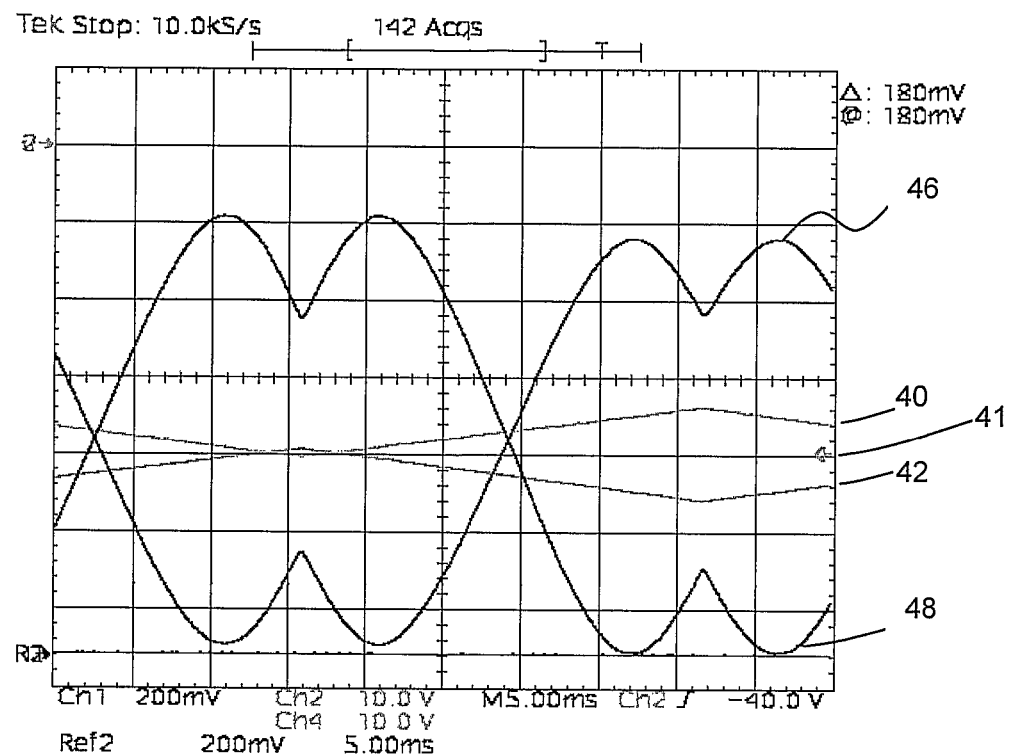
FIG. 5 illustrates one example of the response of the electro-optic waveguide polarisation modulator of FIG. 3. Specifically.

FIG. 5 illustrates the response of the electro-optic waveguide polarisation modulator of FIG. 3. Specifically, FIG. 5 is an oscilloscope trace showing the output optical signal 46, 48 from the polarisation modulator with a horizontal input polarisation at a wavelength of 1550 nm. Linear ramp voltages 40, 42 with opposite gradients were applied to the first and second electrodes 22, 24 respectively such that their mean 41 was constantly equal to the phase-matching voltage. The differential signal voltage $V_{signal}$ is given by the difference between the two. The device output was analysed using a Glan-Taylor polariser and a detector. The horizontal 46 and vertical 48 polarisation output signal levels are shown, indicating the switch in the output from horizontal 46 to vertical 48 polarisation state, which requires an 8V change in the signal voltage. At the horizontal state peak, the horizontal/vertical polarisation extinction ratio was 20 dB. At the vertical state peak the horizontal/vertical polarisation extinction ratio was 13 dB. The voltage signals are plotted on a scale of 10 V per division.

Figure 6:
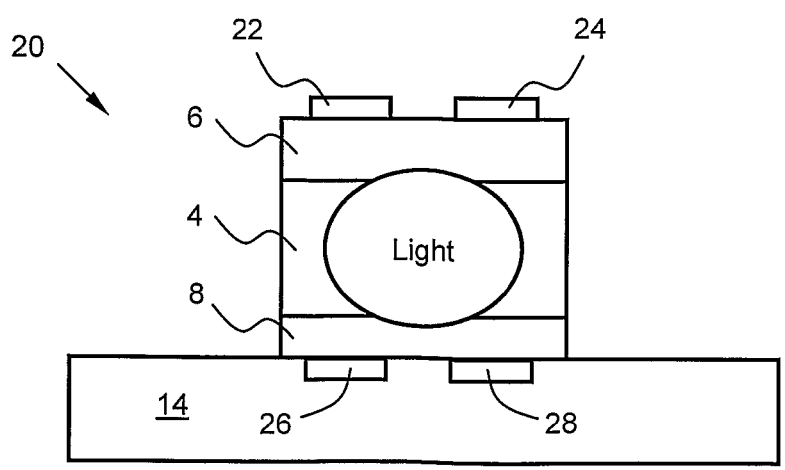
FIG. 6 shows a schematic cross-sectional illustration of an electro-optic waveguide polarisation modulator according to another embodiment of the present invention having a plurality of electrodes in the vicinity of the lower cladding layer.

Another embodiment of the present electro-optic waveguide polarisation modulator is show in cross-section in FIG. 6. The structure of the device is similar to that of FIG. 2, however an additional lower electrode 28 is provided on the second cladding layer 8. The provision of fourth electrode 28 facilitates control of the vertical and horizontal electric fields within the device.

The foregoing embodiments may be used for switching speeds up to about 1 GHz, however for faster switching frequencies the voltage applied to the electrodes 22, 24, 26, 28 must be treated as a radio frequency (RF) signal, as its wavelength is less than one order of magnitude longer than the electrode. A simple lumped electrode will not respond quickly enough in this case, so the electrical aspects of the polarisation modulator must be designed for microwave operation. Travelling-wave electrode structures are well-proven in similar GaAs devices such as Mach-Zehnder interferometer intensity modulators. These involve an RF transmission line which is designed to carry the signal at a group velocity which is matched to that of the light, so that the optical group is subject to the same refractive index distribution throughout its transit along the waveguide. Additionally the transmission line is designed with a characteristic impedance which matches that of the RF signal source and termination. This is often 50Ω. These proven designs are compatible with the present waveguide polarisation modulator described herein.

Accordingly, the present waveguide polarisation modulator may be configured as a travelling-wave device with coplanar strip line (CPS) electrodes, allowing switching speeds of 40 GHz or more. Hence, the present polarisation modulator may be integrated with other waveguide structures including devices that require a horizontal polarisation state, such as a Mach-Zehnder interferometer intensity modulator. This is not possible with the conventional single-electrode polarisation modulator of FIG. 1 on its own, because it is not compatible with a horizontal input polarisation state.

Alternative configurations of the polarisation modulator are envisaged in which the twin-electrode polarisation modulator 20 is operated in a restricted mode, requiring the application of only one time-varying voltage signal. Such operation may be convenient in certain circumstances, including operation at RF switching speeds. Many applications of these types of devices do not require full functionality, for example fast horizontal-vertical polarisation conversion has applications in optical telecommunications, and this would only require the application of one RF signal. Other applications would use a fixed input polarisation. Accordingly, the present polarisation modulator may be configured in a number of different ways to enable different degrees of functionality.

Figure 7:
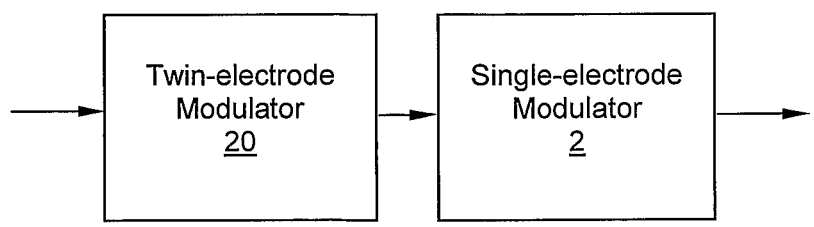
FIG. 7 shows a schematic block representation of a multiple-stage electro-optic waveguide polarisation modulator according to another embodiment of the present invention. In this embodiment, the electro-optic waveguide polarisation modulator comprises a two-stage device.

FIG. 7 shows a schematic block representation of a multiple-stage electro-optic waveguide polarisation modulator according to another embodiment of the present invention. In this embodiment, the electro-optic waveguide polarisation modulator comprises a twin-electrode polarisation modulator 20 followed by a conventional single-electrode device 2. The multiple stage device is capable of providing any output polarisation state on the Poincaré sphere from a fixed input state. In this case the twin electrode stage 20 is not required to have full functionality. For the example of a horizontal linear input polarisation, the twin electrode stage 20 is operated with a fixed vertical electric field $E_v$ to provide horizontal-vertical phase matching, while the horizontal electric field $E_h$ within the device is varied to convert any proportion of the light to vertical polarisation. This could be carried out at RF switching speeds. The single electrode stage 2 would then be used to alter the phase of the horizontal component relative to the vertical component. This could also be carried out at RF switching speeds. This example is of relevance to applications where the device is to be used immediately after a laser source.

Figure 8:
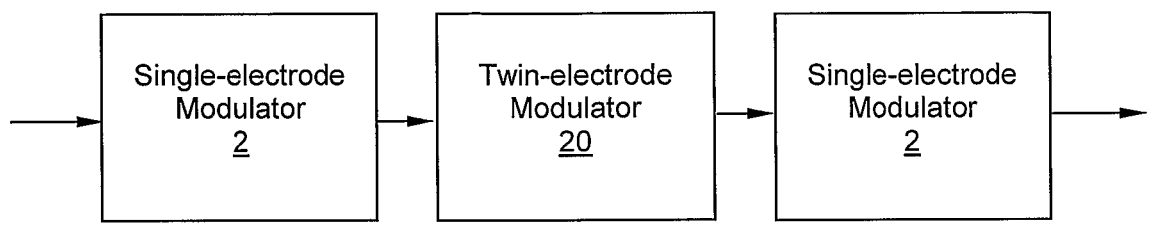
FIG. 8 shows a schematic block representation of a multiple-stage electro-optic waveguide polarisation modulator according to another embodiment of the present invention. In this embodiment, the electro-optic waveguide polarisation modulator comprises a three-stage device.

If the input polarisation state is not fixed, and the twin-electrode stage 20 is to be operated in restricted mode, then an additional single-electrode stage 2 is required before the twin-electrode stage 20 for all output states to be available. This modulator can change any input polarisation state on the Poincaré sphere to any other state on the sphere. FIG. 8 illustrates such a configuration comprising a conventional single-electrode device 2, followed by a twin-electrode polarisation modulator 20 and a further a conventional single-electrode device 2. In this embodiment, the first single-electrode stage 2 shifts the phase of the horizontal component to $\pm\pi/2$ relative to the vertical component. The second and third stages 20, 2 then operate as for the two-stage device of FIG. 7 described above.

The electro-optic polarisation modulator according to the present invention can be configured in different ways (see FIGS. 2, 6, 7, and 8) to enable the modulation of the polarisation state to any point on the Poincaré sphere. This enables the present electro-optic polarisation modulator to operate as a transmitter within an optical communication system by modulating the polarisation state of an optical signal transmitted thereby. Similarly, the present electro-optic polarisation modulator can operate as a receiver within such an optical communication system, enabling the polarisation state of a received optical signal to be determined.

When a polarised signal is transmitted between a transmitter and receiver part of a system either through optical fibre, or other waveguide medium or through a gas or vacuum or a combination of media, it is possible for the polarisation state to be distorted by rotation around the Poincaré sphere. The modulator in this invention enables the correction of this distortion by applying either a compensating pre-change at the transmitter or a post-change at the receiver following measurement of the change.

By way of a further example application, the present polarisation modulator 20 finds application in quantum cryptography (QC) applications where it offers a unique combination of properties that enhance the performance of a QC system; namely the ability to modulate the polarisation over a range of states, ability to modulate polarisation at very high repetition rates and compact design with a single laser source. In addition it inherently provides more security than previously known QC designs that use multiple independent light sources for each polarisation state. Insecurity arises with the prior art QC designs that use multiple sources because it might be possible to find small differences in amplitude profile, the spatial profile, wavelength or spectral features and temporal characteristics such as pulse width, relative time delays or frequency chirping. By using a single light source in combination with the present polarisation modulator these potential differences are prevented.

Some of the particular unique QC applications are outlined below. Note, only some of the QC protocols are mentioned below but in principle the present waveguide polarisation modulator is beneficial to be used for any protocol requiring more than two polarisation states.

With regard to the wavelength of operation, the waveguide polarisation modulator can be designed to operate within a wavelength range 0.6 μm-17.0 μm. The polarisation modulator can be used in free space systems or fibre-optic systems.

The present polarisation modulator can potentially modulate the polarisation of an input light source with four different output polarisation states suitable for application to the BB84 protocol used in quantum cryptography. The four polarisation states required for BB84 could be a combination from any of the three pairs of polarisation states commonly used in QC applications; namely 0° and 90°, 45° and −45°, and left and right circular. Each pair is called a basis, and while the two states in each basis are orthogonal, the relative polarisations between different basis are non-orthogonal. Therefore it is possible that some implementations of QC protocols may use other non-orthogonal pairs.

Since the polarisation modulator is capable of providing six polarisation states (0° and 90°, 45° and −45°, and left and right circular) it is suitable for the six-state polarisation protocol (see for example D. Bruss, 'Optimal eavesdropping in quantum cryptography with six states', Phys Rev Lett 81, p 3018-3021 (1998); and H. Bechmann-Pasquinucci, N. Gisin, 'Incoherent and coherent eavesdropping in the 6-state protocol of quantum cryptography', Phys Rev A 59, p 4238-4248 (1999)).

The present polarisation modulator is also suitable for continuously variable state polarisation modulation. This is a relatively new protocol that requires the ability to vary the number of polarisation states of a light source. Security is based on the measurable difference in intensities between each polarisation state being less than the quantum noise in the channel. A polarisation based scheme has not yet been knowingly implemented but could be enabled by application of the current modulator of FIG. 2, 6, 7, or 8.

The modulator of FIGS. 2, 6, 7, and 8 can also be used in a QC receiver. For example, part of the BB84 protocol requires that the receiver randomly select the measurement basis and then deterministically measure the polarisation state. The modulator can be used in a receiver by applying a random signal to switch between any two polarisation basis, for example to select either the −45° and 45° basis, or left-circular and right-circular basis. This is achieved by selecting a single voltage for each basis, for example −45° or left-circular. In this way if either −45° and 45° polarisation is incident on the modulator then the output is either −45° and 45°. Similarly if left-circular and right-circular is incident then −45° and 45° is also output. The output polarisation states can then be detected by a pair of detectors after a polarisation beamsplitter arrangement (not shown). The six-state protocol would operate in a similar way but by using one of three voltages to select each basis.

Implementation of QC in optical fibre has a well known problem that polarisation distortion causes problems for effective operation. The use of an additional polarisation modulator according to the present invention as described earlier either at the transmitter or receiver could be used to compensate for the distortions. This could be implemented with devices as shown in FIGS. 2, 6, 7, and 8.

The present polarisation modulator 20 can also be used in a Light Detection and Ranging (LIDAR) system. A coherent LIDAR transceiver typically contains an optical source emitting linearly polarised light, followed by a series of optical components that permit the transmission of light, the collection of received light, interference between the received light and a local oscillator component of the light, and detection of the resulting optical signal. In order that the output aperture can also be used as a receiver aperture, a set of optical components is used to direct the received light along a path to interfere with the local oscillator light. This process requires several polarisation transformations, which are typically performed using a quarter-wave plate and a half-wave plate. In an integrated optical form of this system, the functions performed by the quarter-wave plate and a half-wave plate may be performed by two polarisation modulators 20, with an appropriate choice of fixed voltages. This application of the polarisation modulator invention is enabled by the feature of the component that it may be fabricated using the same process as a range of other integrated optical components.

Although specific embodiments of the present electro-optic waveguide polarisation modulator have been described in terms of a gallium arsenide/gallium aluminium arsenide architecture, the modulator may be fabricated from other III-V materials e.g. indium gallium arsenide (InGaAs) alloys, indium gallium aluminium arsenide phosphide (InAlGaAsP) alloys, indium phosphide (InP), indium antimonide (InSb), gallium nitride (GaN); II-VI materials, lithium niobate, strained silicon or an electro-optic polymer material.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived there from. In particular, with reference to the appended claims, features from dependent claims may be combined with those of the independent claims and features from respective independent claims may be combined in any appropriate manner and not merely in the specific combinations enumerated in the claims.

The invention claimed is:

1. An electro-optic waveguide polarisation modulator comprising:
   a waveguide core having first and second faces defining a waveguide core plane,
   a plurality of primary electrodes arranged at a first side of the waveguide core plane and out of said plane, and
   at least one secondary electrode arranged at a second side of the waveguide core plane and out of said plane, wherein the electrodes are configured to provide an electric field having field components in two substantially perpendicular directions within the waveguide core so as to modulate the refractive index thereof such that electromagnetic radiation propagating through the core is convertible from any first polarisation state to any second polarisation state.

2. An electro-optic waveguide polarisation modulator according to claim 1 comprising a plurality of the secondary electrodes within the second electrode layer.

3. An electro-optic waveguide polarisation modulator according to claim 1 wherein the primary electrodes comprise coplanar stripline electrodes adapted in use to provide an electric field which propagates in a longitudinal direction within the waveguide core at substantially the same speed as that of optical electromagnetic radiation propagating therein and being matched thereto.

4. An integrated optical waveguide system comprising a polarisation modulator according to claim 1.

5. An optical communication network comprising a polarisation modulator according to claim 1, wherein the modulator is adapted in use to compensate for polarisation distortion arising within said network.

6. An optical communication network according to claim 5 wherein the polarisation modulator is adapted in use to apply a polarisation compensation at at least one of a transmitter in the network, a receiver in the network, and at any position along which an optical signal is transmitted through the network.

7. An optical communication network according to claim 6 wherein the polarisation modulator is adapted in use to apply a polarisation pre-compensation at a transmitter in the network so as to compensate for polarisation distortion arising within said network.

8. A quantum cryptography system comprising a polarisation modulator according to claim 1.

9. A quantum cryptography system according to claim 8 wherein the polarisation modulator is adapted in use to modulate an optical signal transmitted there-from.

10. A quantum cryptography system according to claim 9 wherein the polarisation modulator is adapted in use to modulate the transmitted optical signal such that said signal comprises a desired quantum cryptographic polarisation state having a compensating pre-change applied thereto to compensate for polarisation distortion arising within said system.

11. A quantum cryptography system according to claim 8 wherein the polarisation modulator is adapted in use to modulate an optical signal received there-by.

12. A light detection and ranging system (LIDAR) comprising a polarisation modulator according to claim 1.

13. A method of modulating the polarisation of electromagnetic radiation using a polarisation modulator according to claim 1 comprising the steps of:
   (i) inputting electromagnetic radiation having a first polarisation state into the polarisation modulator,
   (ii) applying a first voltage $V_1$ between a first primary electrode and at least one secondary electrode and applying a second voltage $V_2$ between a second primary electrode and at least one secondary electrode, so as to provide an electric field component in a first direction within the waveguide core substantially perpendicular to the waveguide core plane so as to modulate the refractive index of the waveguide core in a direction substantially perpendicular to the first direction, and an electric field component in a second direction within the waveguide core substantially parallel with the waveguide core plane so as to modulate the refractive index of the waveguide core in directions inclined at angles ±45° to the first direction,
such that electromagnetic radiation propagating through the core is convertible from any first polarisation state to any second polarisation state.

14. A method according to claim 13 comprising the further step of:
   (iii) outputting electromagnetic radiation having the second polarisation state from the polarisation modulator.

15. A method according to claim 13 wherein the magnitude of the modulation of the refractive index in the direction substantially perpendicular to the first direction within the waveguide core is proportional to the mean value of the first voltage $V_1$ and the second voltage $V_2$.

16. A method according to claim 13 wherein the magnitude of the modulation of the refractive index in directions inclined at angles ±45° to the first direction within the waveguide core is proportional to the modulus of the difference between the first voltage $V_1$ and the second voltage $V_2$.

17. A method of modulating the polarisation state of electromagnetic radiation propagating in an electro-optic waveguide core having first and second faces defining a waveguide core plane, comprising the step of providing within the waveguide core from a first position outside the waveguide core plane adjacent the first face and a second position outside the waveguide core plane adjacent the second face an electric field having field components in a first direction and in a second direction substantially perpendicular to the first direction such that the electromagnetic radiation propagating through the core is convertible from any first polarisation state to any second polarisation state.

18. A method according to claim 17 wherein the first direction is substantially perpendicular to the waveguide core plane.

19. A method according to claim 17 wherein the second direction is substantially parallel with the waveguide core plane.

* * * * *